Oct. 28, 1958  A. M. WRIGHT  2,857,739
CONTROL SYSTEM FOR TURBO-JET ENGINE
Filed April 6, 1951  3 Sheets-Sheet 3
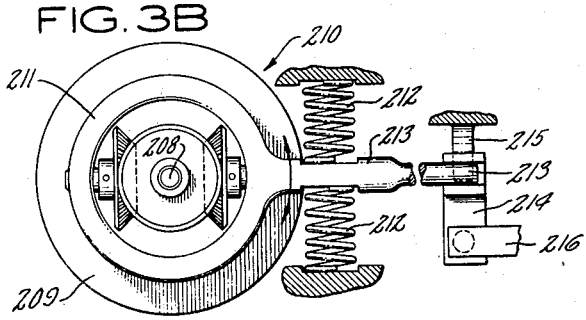
FIG. 3B
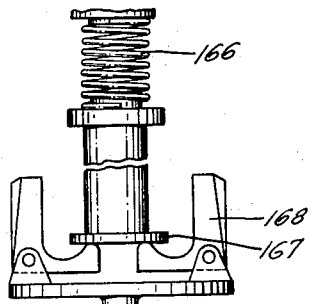
FIG. 3A
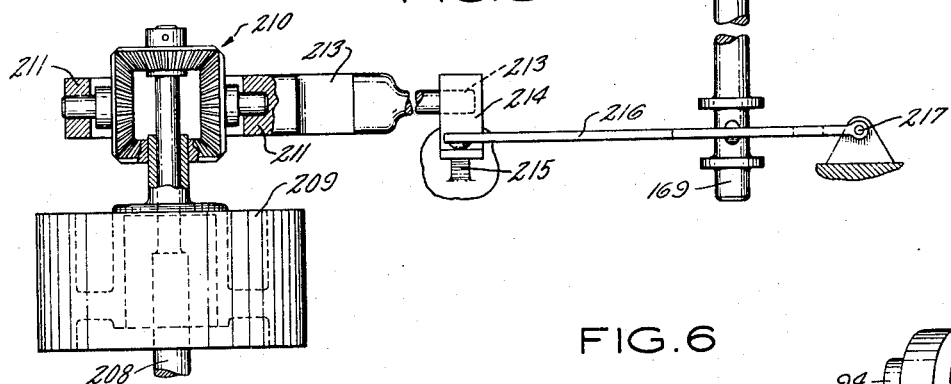
FIG. 6
FIG. 5
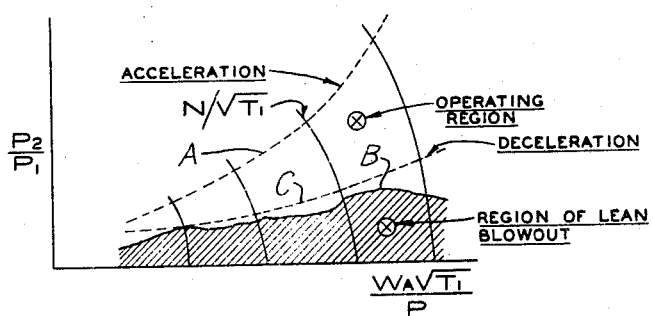
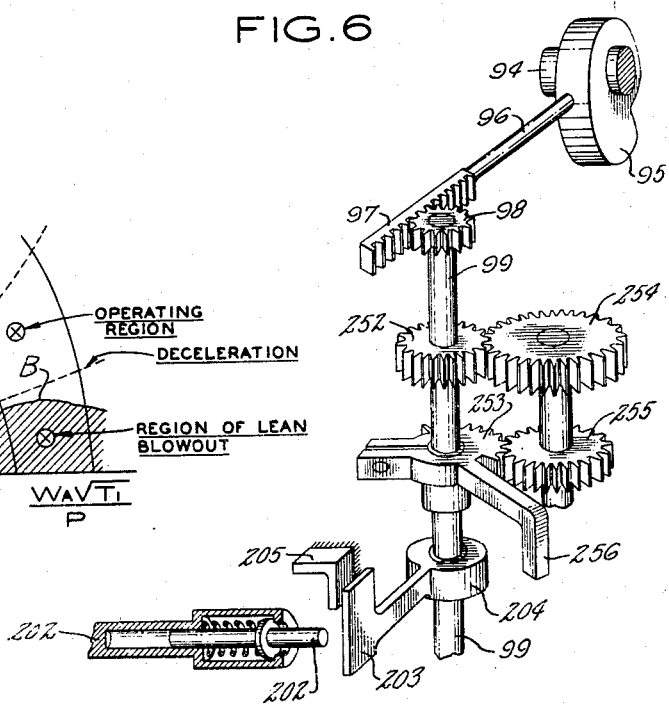
INVENTOR
A. M. WRIGHT
BY *Alec Prentis*
ATTORNEY

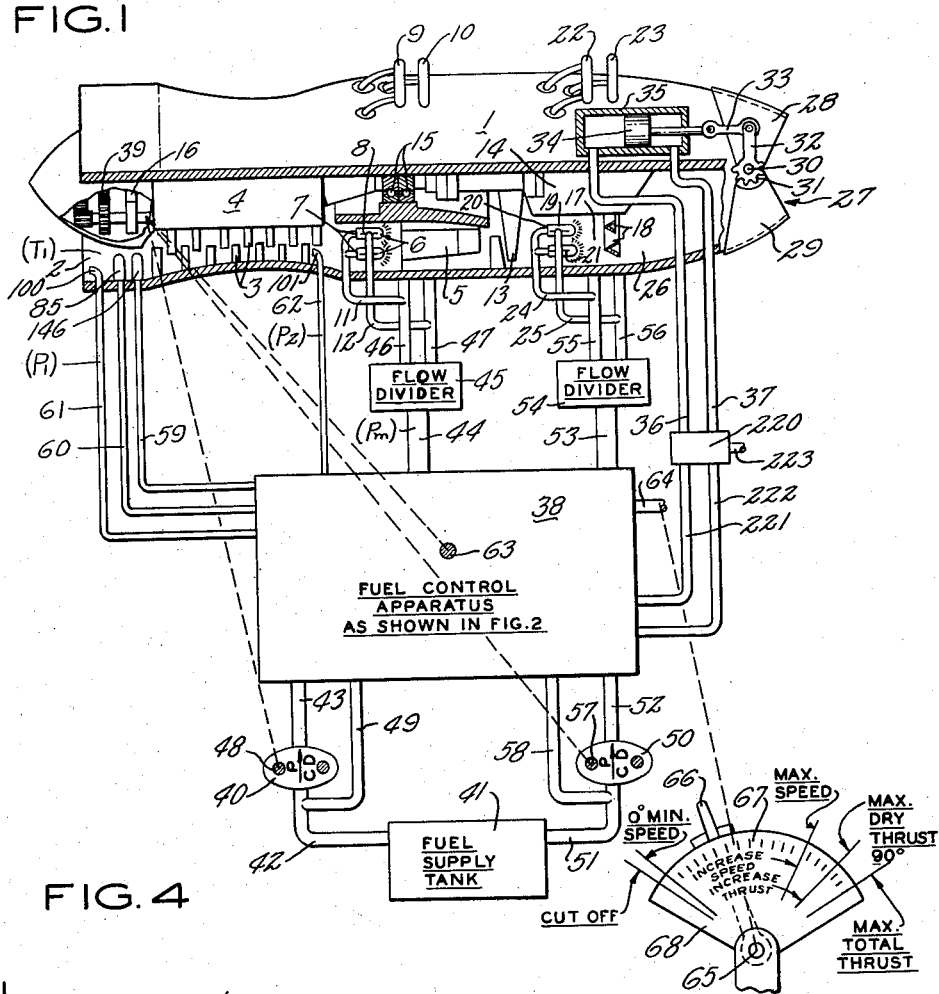

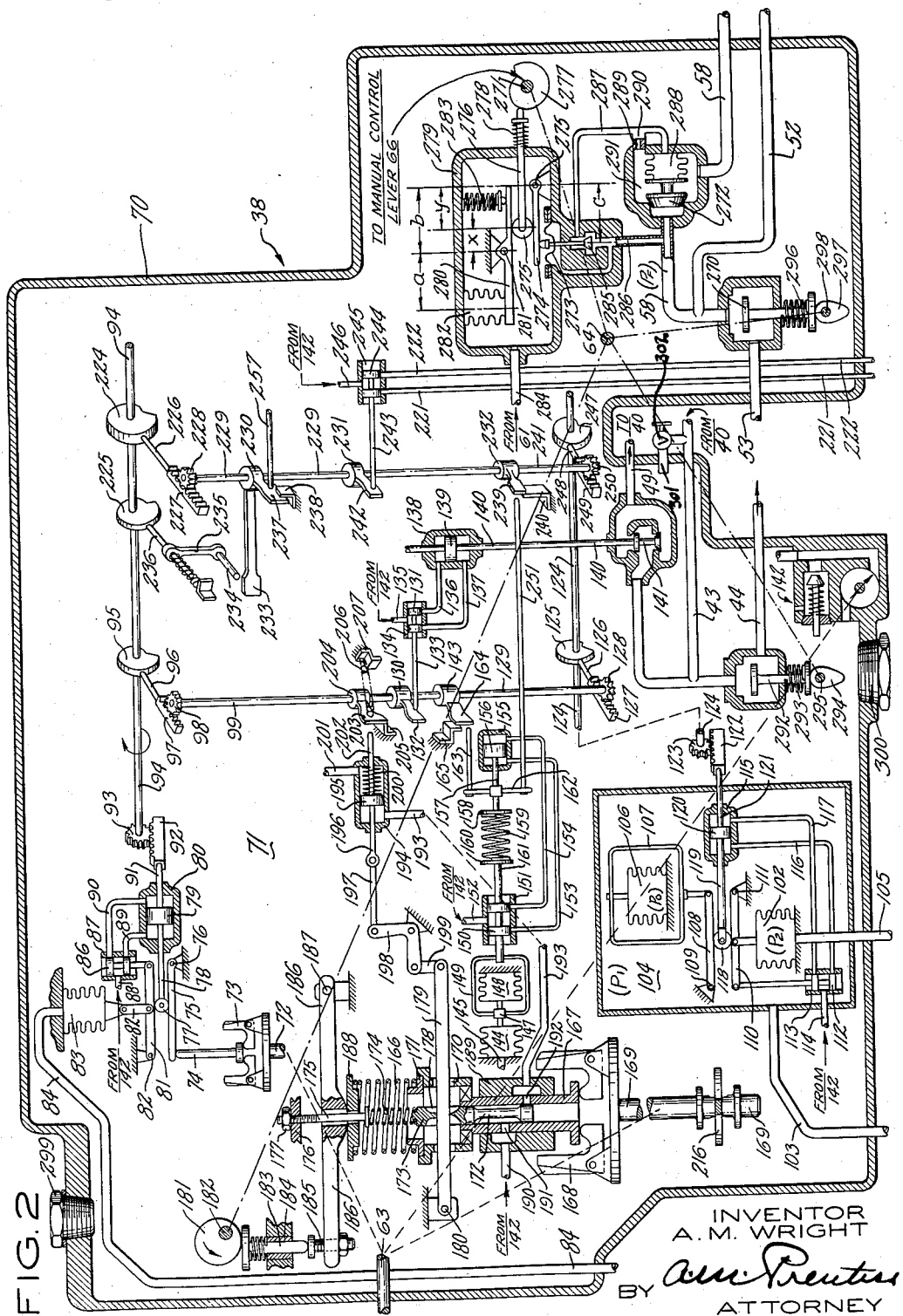

United States Patent Office 2,857,739
Patented Oct. 28, 1958

2,857,739

CONTROL SYSTEM FOR TURBO-JET ENGINE

Alexander M. Wright, West Hartford, Conn., assignor, by mesne assignments, to Pratt & Whitney Company, Incorporated, West Hartford, Conn., a corporation of Delaware Application April 6, 1951, Serial No. 219,594

39 Claims. (Cl. 60—35.6)

This invention pertains to control systems for turbo-jet engines, and more particularly has reference to automatic control systems for aircraft turbo-jet engines, equipped with variable area exhaust gas nozzles, and with means for propulsive thrust augmentation by tailpipe afterburning.

Such aircraft engines usually comprise, in the following order from front to rear: an air inlet; an air compressor, one or more combustion chambers; a gas turbine for driving the compressor; a tailpipe, terminating in a discharge nozzle, for discharging exhaust gases rearwardly to the atmosphere, in the form of a propulsive jet; means for burning additional fuel in the tailpipe to augment the jet thrust; and means for varying the area of the discharge nozzle as one of the controlled elements. Associated with such an engine is a fuel supply system comprising a fuel tank; one or more fuel pumps, for delivering fuel to the combustion chambers and to the afterburners in the tailpipe; and a control apparatus for regulating the fuel supply as a function of a pilot's manual control and variables, including ambient atmospheric density, speed of flight, engine speed and temperature, and other engine operating conditions. This invention is particularly concerned with such a control apparatus, which also includes means for controlling the fuel supply to the tailpipe afterburners, and means for varying the area of the tailpipe discharge nozzle, as additional controlled elements.

Owing to structural and metallurgical limitations, aircraft engines of the type referred to cannot be safely operated at speed and temperatures beyond predetermined limiting values, which vary with ambient atmospheric temperature and pressure and other operating conditions, but for maximum efficiency and economy of operation, both engine speed and temperature must be maintained at or near their limiting safe values. At the same time, while engine speed is a critical factor in aircraft flight performance, an engine cannot be operated at maximum speed at all times, at all flight speeds, or under all flight conditions. Fuel control apparatus should, therefore, enable the pilot to vary engine speed and power as desired from a required minimum to the predetermined maximum safe limit of speed and power, and permit changes in the selected operating conditions to be completed safely and in the shortest possible time. The control of engine temperature should also be an automatic function of the fuel control apparatus, during transient and maximum speed conditions.

The value of engine speed, corresponding to any given value of fuel flow, varies as a function of speed of flight, ambient air temperature and pressure, rate of mass air flow through the engine, and a wide variety of other variable factors. While it is desirable that the fuel flow be regulated in accordance with as many as possible of the variable factors that affect engine operation, for precise regulation of engine speed and to avoid excessive engine temperatures, it is not feasible to rely upon an automatic regulation of fuel flow as a function of variables which exclude engine speed and temperature. Also, where the engine is equipped with tailpipe afterburners and a variable area exhaust nozzle, as means for augmenting its propulsive power, it is essential that the fuel flow to the afterburners and the opening of the exhaust nozzle be regulated, in coordination with the regulation of the fuel flow to the combustion chambers of the engine, and preferably by a single control apparatus.

It is further, highly desirable that the control apparatus be itself controlled by a single manual control lever which permits operation at any selected engine R. P. M., and is adapted to be moved through four successive ranges of operation, as follows:

(1) From "cut-off" position, where the engine is not operating and all fuel flow to the engine is cut off, to "minimum speed" position, corresponding to the minimum operating speed of the engine;

(2) From "minimum speed" position to "maximum speed" position, during which the engine operates at maximum economy, at any selected R. P. M. corresponding to the position of the manual control lever in this range, up to maximum safe engine R. P. M.;

(3) From "maximum speed" position to "maximum dry thrust" position, during which the propulsive thrust developed by the engine is increased in proportion to the movement of the manual control lever in this range, up to the point of development of maximum dry thrust; and (4) From "maximum dry thrust" position to "maximum total thrust" position, in which afterburning is initiated and the afterburning augmented thrust is proportional to the movement of the manual control lever beyond "maximum dry thrust" position.

The control of all these functions by a single manual control lever necessitates that the control apparatus automatically provide for the proper regulation of engine behavior during transient conditions, such as would follow a step change in manual lever position, as well as control of engine operation in steady state running.

Heretofore, control apparatus for turbo-jet aircraft engines has generally been concerned with regulating the fuel flow to the engine in accordance with various operating factors which affect engine speed and power, such as rate of mass air flow through the engine, density of ambient atmosphere, engine torque, and speed of flight, and separate control devices have been provided to regulate the operation of exhaust nozzle area-varying means and the functioning of tailpipe afterburning for thrust-augmentation. Moreover, these separate control apparatuses have usually required the use of a plurality of control levers for their operation, all of which has added greatly to the burden of the pilot in controlling the performance of his aircraft in flight. So far as applicant is aware, no prior art control apparatus for aircraft turbo-jet engines has embodied in one unit package means for simultaneously and coordinately regulating the fuel flow to the engine in accordance with all the important variables which affect engine speed and power, together with means for regulating the operation of exhaust nozzle area-varying devices and the functioning of tailpipe afterburners for thrust-augmentation, and in addition to make such a master control apparatus completely operable by a single manual control lever.

It is accordingly an object of this invention to provide such a master control apparatus which incorporates the essential and desirable control features mentioned hereinabove, and which is completely operable by a single manual control lever, adapted to move through the four successive operating ranges indicated above.

Other objects of this invention are to provide:

An improved control apparatus which regulates the rate of fuel flow to the engine so as to produce optimum combustion and power output under varying engine operating conditions.

An improved control apparatus, in which the working parts may operate in a bath of its own liquid (fuel), or a separate operating liquid, and are actuated by hydraulic pressure generated by an integral pump working on engine fuel, or a separate operating liquid, as desired.

An improved control apparatus which acts directly on the fuel supplied to the engine by an associated constant-displacement fuel pump and regulates its flow by means of a suitably controlled by-pass valve.

An improved control apparatus which permits the pilot to select and maintain a substantially constant engine speed, corresponding to the selected position of a single manual control lever, under variable engine operating conditions, at any engine speed between idle and maximum permissible speed (R. P. M.).

A control apparatus which insures maximum fuel flow to the engine during acceleration at any condition of altitude, ambient air temperature, or airplane speed, consistent with avoidance of compressor stall or excessive engine temperature.

A control apparatus wich regulates the exhaust nozzle area during acceleration and deceleration, so as to permit the greatest possible change in R. P. M. per second, and which regulates the fuel flow to the engine during deceleration so as to avoid lean burner blowout.

A control apparatus which regulates the exhaust nozzle area so as to give maximum efficiency at every steady state engine speed (R. P. M.) between idle and maximum permissible speed; and which permits selecting additional propulsive thrust by exhaust nozzle regulation at any value desired up to the maximum permitted by engine structural and metallurgical limitations.

A control apparatus which comprises means for attaining additional propulsive thrust by tailpipe afterburning, at any selected value up to maximum augmented thrust, and means for protection against loss of thrust in case of failure of afterburner ignition.

With these and other objects in view which may be incident to my improvements, my invention consists in the combination and arrangement of elements hereinafter described and illustrated in the accompanying drawings, in which:

Figure 1 shows, somewhat diagrammatically, a turbo-jet engine, equipped with tailpipe afterburners and means for varying the exhaust nozzle area; together with a control apparatus which operates in conjunction with a constant displacement fuel pump and a manual control lever, and the principal connections therebetween;

Figure 2 shows, diagrammatically, a control apparatus embodying the principles of my invention;

Figure 3–A is a diagrammatic elevation (partly in vertical section) of the speed governor anticipating device, and Figure 3–B is a plan view (partly in horizontal section) of the device;

Figure 4 is a diagram showing the relation between corrected air speed and corrected thrust of an airplane propelled by a jet engine;

Figure 5 is a diagram showing the relation between compressor pressure ratio and corrected air flow through a turbo-jet engine;

Figure 6 is a detail isometric view of the variable stop mechanism forming a part of the deceleration control in my invention; and Figure 7 is a horizontal section of the manual control quadrant shown in Figure 1.

Broadly comprehended, my invention comprises a control apparatus for aircraft turbo-jet engines in which are contained in a single unitary package, means, responsive to a single control lever, for simultaneously and coordinately regulating: (1) the fuel flow to the main combustion chamber of the engine; and (2) to the tailpipe afterburners; and (3) the opening of the exhaust gas nozzle; so that the desired engine speed and propulsive thrust can be obtained, under varying engine and flight operating conditions, by an indicated setting of the control lever.

The control system of my invention is of the "fuel-air" type, whereby the engine is maintained within safe operating limits as to temperature and speed by regulation of the engine fuel-air ratio, with provision for arbitrary selection of any desired engine output within these limits. Since an aircraft turbo-jet engine must operate over a wide range of ambient atmospheric conditions, the air flow through the engine varies over a corresponding wide range. The difficulty of obtaining a control signal that is a direct indication of mass air flow, and of specifying a fuel-air ratio that will define the engine operating limits at every combination of exhaust nozzle area, degree of thrust-augmentation, and so on, is obviated in my invention by incorporating in the control apparatus an indirect method of controlling the fuel-air ratio. In this method, no direct measurement of either fuel flow or air flow is made, but the fuel flow is regulated in relation to control signals that are an indirect function of engine mass air flow. Also, in my invention, no electrical components are used in the control, and measurements of high temperature, which are usually carried out with the aid of thermocouples, are in my control apparatus arrived at without direct measurement.

In the control of any plant or process, the input required to maintain the desired output may be decided on from the characteristics of the system, and then the controller may be built to measure the output or something related to the output, and to meter the input according to some pre-scheduled relationship to this measured output or as a function of some other variable such as time. For example, in a turbo-jet engine, we may decide that the acceleration fuel input should be related to a limiting engine output, say the compressor discharge pressure, and the controller may be constructed to meter the fuel during acceleration according to a predetermined schedule of compressor pressure.

An alternative to this approach is to decide on an output limitation of the plant or engine, and then construct a controller which will measure the actual output of the plant, and modify the input in such a way as to nullify the error between the desired and the actual output. For example, in a turbo-jet engine the desired running speed may be decided on by the pilot, and in the so-called steady state condition the speed governor acts to correct any error that may exist between the desired speed and the actual measured speed.

The latter approach is equivalent to considering the controller and engine as a servo mechanism, and is in general to be preferred where accuracy of control is desired.

The method of control herein disclosed is to set up a permissible magnitude for a quantity that is developed by the engine such that, as long as the actual measured magnitude of that quantity does not exceed the permissible value, the engine will be operating in a safe region. There is an additional requirement that for optimum performance of the engine the actually existing magnitude of the quantity must be very close to the permissible magnitude.

The control described herein is devised to compare the actual measured value of the control quantity with its permissible magnitude, and to apply a correction to the engine input that is related to the error between the permissible and measured value of the control magnitude, in the manner hereinafter indicated. More specifically, my invention comprises a regulating system that is based upon setting up control parameters, such as compressor pressure ratio modified by compressor inlet temperature, which represent the desired output of the engine, and the system works to match the output of the engine to the determined value of these parameters. The regulation of the fuel flow is achieved by varying the output of a separate constant-displacement fuel pump by means of a relief valve, or a throttling valve, in the control apparatus, the fuel flow being varied in such a manner as to nullify the error between the desired and actual engine output.

The control functions found to be necessary by a study of the engine characteristics, and which are performed by my control apparatus, include the following:

(1) Admission of maximum engine fuel during acceleration at any condition of altitude, temperature or airplane speed, consistent with avoidance of compressor stall or excessive engine temperature.

(2) Control of exhaust nozzle area during acceleration to permit the greatest possible change in R. P. M. per second.

(3) Control of fuel flow during deceleration to avoid lean blowout.

(4) Control of exhaust nozzle area during deceleration to permit the greatest possible change in R. P. M. per second.

(5) Means for selecting and maintaining the desired R. P. M. at any value between idle and full R. P. M.

(6) Control of exhaust nozzle area to give maximum efficiency at every steady state R. P. M. between idle and full R. P. M.

(7) Means, at full R. P. M., for selecting additional thrust by exhaust nozzle control at any value desired up to the maximum permitted by engine limitations.

(8) Means for attaining additional thrust by tailpipe afterburning, at any selected value up to maximum augmented thrust.

(9) Protection against loss of thrust in case of failure of afterburner ignition.

Referring now to Figure 1 of the drawings, there are shown as the principal elements of the engine referred to above: a supporting casing 1, an air inlet 2, a multistage air compressor 3 having a rotor shaft 4, one of a number of combustion chambers 5, a series of main combustion nozzles 6, each having fixed slot orifices 7 and auxiliary slot orifices 8, connected respectively to two generally circular main fuel manifolds 9 and 10, by means of conduits 11 and 12; a gas turbine 13 having a rotor shaft 14 connected to the compressor rotor shaft 4, said shafts being mounted in a center bearing 15 and end bearing 16 supported by casing 1; an afterburner combustion chamber 17 in which are located flame baffles 18 and a series of afterburner combustion nozzles 19, each having fixed slot orifices 20 and auxiliary slot orifices 21, connected respectively to two generally circular afterburner fuel manifolds 22 and 23, by means of conduits 24 and 25; a tailpipe 26 for discharging exhaust gases from turbine 13 through a nozzle 27 whose area is varied by a pair of adjustable eyelids 28 and 29, rotatably mounted upon a shaft 30 and interconnected by a gear pinion and arcuate rack 31. Eyelids 28 and 29 are actuated by an arm 32 rigidly attached to eyelid 28 and connected by a link 33 to a piston 34 which is slidably mounted in a cylinder 35, supported on the outside of casing 1. The opposite ends of cylinder 35 are respectively connected by conduits 36 and 37 to a pilot valve 220 which in turn is connected by conduits 221 and 222 to fuel control apparatus 38 (shown in detail in Figure 2). Connected to the compressor shaft 4 near its forward end is a gear train 39 for operating the fuel control apparatus 38, fuel pumps and other accessories.

A constant-displacement main boost pump 40 draws fuel from a supply tank 41 through a conduit 42 and delivers it through a conduit 43 to fuel control apparatus 38, from which the main fuel flows through a conduit 44 to a pressure-responsive flow divider 45, and from thence through conduits 46 and 47 to main fuel manifolds 9 and 10, respectively. Pump 40 is operated by a drive shaft 48 connected to gear train 39, or to any other suitable source of power. Fuel control apparatus 38 acts to vary the quantity of main fuel delivered to the engine, per unit of time, as required by the operating conditions, and the difference between the fuel delivered by pump 40 and the quantity required by the engine is by-passed by a relief valve in fuel control apparatus 38 and return conduit 49 to the inlet side of the pump 40.

In each of the main combustion nozzles 6 there is a series of fixed slot orifices indicated at 7, through which the fuel enters the nozzles 6 from conduit 11. The fuel flow from the nozzles 6 is directly proportional to the effective area of slots 7 and is a square root function of the pressure drop in the nozzles, which is substantially equal to the pressure ($p_m$) in conduit 44 minus the pressure ($P_2$) in the combustion chamber 5. As it is desired to limit the range of fuel pressures so that their value at maximum fuel flow is less than that corresponding to the square root function of the drop across slots 7, the nozzles 6 are provided with auxiliary slots 8 supplied by manifold 10, connected to the pressure-responsive flow divider 45 which opens at a predetermined value of the pressure ($p_m$) in conduit 44. In this manner, the pressure ($p_m$) may be maintained sufficiently high to produce satisfactory nozzle discharge without requiring the fuel regulator 38 and pump 40 to operate under unfavorable pressures at maximum flow.

A constant-displacement afterburner boost pump 50 draws fuel from supply tank 41 through a conduit 51 and delivers it through a conduit 52 to fuel control apparatus 38, from which the afterburner fuel flows through a conduit 53 to a pressure-responsive flow divider 54, and from thence through conduits 55 and 56 to afterburner fuel manifolds 22 and 23, respectively. Pump 50 is operated by a drive shaft 57 connected to gear train 39, or to any other suitable source of power. Fuel control apparatus 38 acts to vary the quantity of afterburner fuel delivered to the engine, per unit of time, as required by the operating conditions, and the difference between the fuel delivered by the pump 50 and the quantity required by the afterburners 19 is by-passed by a relief valve in fuel control apparatus 38 and return conduit 58 to the inlet side of the pump 50. Afterburner nozzles 19 are each provided with slots 20 and 21, which are similar to slots 7 and 8 in main combustion nozzles 6 and function in the same manner, as described above.

The fuel control apparatus, indicated by 38 in Figure 1 and shown diagrammatically in Figure 2, is connected by conduits 59 and 60 to two sources of compressor inlet total temperature ($T_1$), located in the engine air inlet 2; by a conduit 61 to a source of compressor inlet total pressure ($P_1$), also located in air inlet 2; and by a conduit 62 to a source of compressor discharge total pressure ($P_2$). As subsequently explained, fuel control apparatus 38 is thus responsive to temperature ($T_1$) and pressures ($P_1$) and ($P_2$). Temperature ($T_1$) and pressure ($P_1$) increase with rate of air flow through the engine and decrease with altitude of flight, while the value of the pressure differential ($P_2-P_1$), which is a measure of the rate of air flow through the engine, increases with engine speed and decreases with altitude of flight, and is also a function of the characteristics of the compressor 3.

A main drive shaft 63 in fuel control apparatus 38 is driven by the engine through gear train 39 at a speed proportional to engine speed (R. P. M.); and a manual control shaft 64, also in control apparatus 38, is oscillated in response to movement of a shaft 65 to which is fixed an engine control lever 66 that is manually operable in reference to a scale 67 on a fixed quadrant 68, calibrated in terms of engine speed and thrust.

Referring to Figure 2; there is shown, somewhat diagrammatically, an embodiment of my invention, denoted by the reference numeral 38 in Figure 1, in the form of a fuel control apparatus, in which all the elements are enclosed in a casing 70 that is maintained approximately full of liquid fuel, so that it functions as a reservoir 71, in which the working elements operate in a lubricating bath of fuel. Alternatively, the casing 70 may be supplied with an operating and lubricating liquid, other than fuel, from a separate source (not shown). Regardless of whether engine fuel, or a liquid other than said fuel, is used as the operating liquid in my control apparatus, casing 70 is hermetically sealed against the entrance of ambient air, or the extraneous escape (leakage) of fluid therefrom; and the term "hermetically sealed" is used to denote such air-tight closure of chamber 70.

Broadly comprehended, the fuel control apparatus shown in Figure 2 comprises the following component control units which are interconnected and act coordinately to perform the multiple functions of the apparatus:
(1) An acceleration fuel control.
(2) An engine temperature control.
(3) An engine speed control.
(4) A variable area exhaust nozzle control.
(5) A deceleration fuel control.
(6) An afterburner fuel control.

Each of these component control units will now be described in detail, in the order indicated.

Acceleration fuel control

This unit is devised to govern the admission to the main combustion chamber 5 of the maximum quantity of engine fuel during acceleration, under any condition of altitude, ambient temperature, or airplane speed, consistent with avoidance of compressor stall or excessive engine temperature. From the performance characteristics of the compressor, it is known that similarity of compressor flow results when the compressor Mach number M is kept constant, and for each value of corrected engine speed (defined as engine speed N, (R. P. M.), divided by the square root of compressor inlet total temperature, or $N/\sqrt{T_1}$), there corresponds a value of compressor ratio $P_2/P_1$ at which the compressor will stall. Also, at any value of $N/\sqrt{T_1}$, an increase in fuel flow causes an increase in $P_2/P_1$, and vice versa, provided other engine conditions remain fixed. In order to avoid compressor stall during engine acceleration, there is set up, for each value of $N/\sqrt{T_1}$, a permissible magnitude for the compressor ratio $P_2/P_1$, which permissible magnitude is compared with the actual measured value of $P_2/P_1$. and the error is nullified by an adjustment of the fuel flow to the engine.

The mechanism by which the permissible magnitude of $P_2/P_1$ is set up for each value of $N/\sqrt{T_1}$ is shown in the upper left-hand portion of Figure 2. A centrifugal speed-responsive device 72, driven from the main drive shaft 63 of control apparatus 38 (Figure 1), has a pair of pivoted flyweights 73 which are arranged to lift a push rod 74 with a force that is proportional to the square of the engine speed, i. e., $N^2$. Rod 74 contacts a lever 75, pivoted at 76, which reacts against a roller 77, mounted on the free end of a piston rod 78 that is connected to a piston 79, slidably mounted in a cylinder 80. Paralleling lever 75 is another lever 81, pivoted at 82, which is held against the upper face of roller 77 by a link 82 that transmits the thrust of a pressure-responsive bellows 83, connected by conduits 84 and 60 to a bulb 85 which is located in air inlet 2 and contains a compressible fluid whose pressure varies linearly with the total temperature $T_1$. The free end of lever 81 is pivotally connected to a pilot valve 86, slidably mounted in a fixed sleeve 87 which is supplied, through a conduit 88, with fluid under pressure from a constant pressure pump 142 in reservoir 71. The interior of sleeve 87 is connected, from points opposite the lands of valve 86 (when in neutral position), with opposite ends of cylinder 80 by conduits 89 and 90.

When the upward thrust of flyweights 73 on roller 77 is equal to the downward thrust of bellows 83 on said roller, the system is in equilibrium and valve 86 is in its neutral position covering the ports of conduits 89 and 90, as shown in Figure 2. Any increase in temperature $T_1$ in air inlet 2, acting on bulb 85, causes a slight expansion of bellows 83 which moves valve 86 down from its neutral position, admits fluid under pressure to the left end of cylinder 80, and moves piston 79 and roller 77 to the right. Conversely, any decrease in temperature $T_1$ will move piston 79 and roller 77 to the left.

Similarly, any increase in engine speed causes flyweights 73 to raise rod 74, levers 75 and 81 and valve 86, which causes movement of piston 79 and roller 77 to the left, while a decrease in engine speed causes piston 79 and roller 77 to move to the right. Any displacement of roller 77 from its neutral position, as shown in Figure 2, unbalances the levers 75 and 81 and causes a movement of valve 86 so as to restore piston 79 and roller 77 to their neutral positions, thereby restoring the equilibrium of the system. Bellows 83 is calibrated so that the force it exerts on roller 77 is proportional to the temperature $T_1$, while the force exerted on roller 77 by flyweights 73 is proportional to the square of the engine speed. Hence, the distance "X" which piston 79 travels in either direction from its neutral position is a function of $N/\sqrt{T_1}$. Since the action of the mechanism is such that the levers 75 and 81 are always maintained in equilibrium, it follows that for every value of $N/\sqrt{T_1}$, there corresponds a value of the position "X" of roller 77 and piston 79.

Piston 79 is connected by a rod 91 to a rack 92 which engages a pinion 93 fixed on a shaft 94, so that the shaft rotates through an angle "$\phi$" proportional to the movement "X" of the rack 92; and since for every value of $N/\sqrt{T_1}$, there is a corresponding value of "X," there is also for every value of $N/\sqrt{T_1}$, a corresponding value of "$\phi$," and the angular displacement of the shaft 94 is a function of $N/\sqrt{T_1}$.

Fixed on shaft 94 is a cam 95, engaged by a follower 96 having a rack 97 which engages a pinion 98 on a vertical acceleration control shaft 99. The cam 95 is profiled in the following manner. There is for any engine, at each value of $N/\sqrt{T_1}$, a value of $P_2/P_1$ which is the limit of stable compressor operation, or expressed otherwise, at which compressor stall occurs. The angular position "$\phi$" of shaft 94 corresponds to some value of $N/\sqrt{T_1}$. The radius of the cam 95 at that value of "$\phi$" is made such as to make the position of the cam follower 96 proportional to the limiting value of $P_2/P_1$ at the value of $N/\sqrt{T_1}$ indicated by the angular position "$\phi$" of the shaft 94. The cam follower 96 moves rack 97 and pinion 98, thus imparting to shaft 99 an angular displacement proportional to the limiting permissible value of $P_2/P_1$ that prevails at the moment. In this manner the permissible magnitude of the limiting quantity $P_2/P_1$ is set up for any value of N and $T_1$.

The actual compressor ratio $P_2/P_1$ is measured by the mechanism shown at the left center of Figure 2. The compressor inlet and outlet total pressures, $P_1$ and $P_2$, are respectively picked up by total pressure Pitot tubes 100 and 101, and admitted to the ratio bellows 102 by conduits 61 and 103, which connect with an air-tight housing 104, and conduits 62 and 105, which connect with the interior of bellows 102, in the manner shown in Figure 2. An evacuated bellows 106, fixed at its lower end inside housing 104 so as to be exposed exteriorly to the pressure $P_1$, has its movable upper end connected by a yoke 107 to a lever 108, pivoted at 109. A similar lever 110, pivoted at 111 inside housing 104, is connected to the movable upper end of bellows 102 which is also exteriorly exposed to the pressure $P_1$ in housing 104. Lever 110 is connected at its free end to a pilot valve 112, slidably mounted in a fixed sleeve 113 which is supplied, through a conduit 114, with fluid under pressure from pump 142 in reservoir 71. The interior of sleeve 113 is connected, from points opposite the lands of valve 113 (when in neutral position), with opposite ends of a cylinder 115 by conduits 116 and 117.

Lever 110 reacts against a roller 118, mounted on the free end of a piston rod 119, which is connected to a piston 120, slidably mounted in cylinder 115. Lever 108 similarly reacts against the upper face of roller 118. When roller 118 is in its neutral position (shown in Figure 2), as defined by the neutral or closed position of pilot valve 112, the lever system is in equilibrium. If either $P_1$ or $P_2$ changes, this equilibrium will be disturbed, and hydraulic fluid will be admitted to one side of the piston 120, moving roller 118 in such a manner as to restore equilibrium. Hence, for every value of $P_2/P_1$ actually measured in the engine, there is a corresponding value of the displacement of piston 120.

Piston 120 is connected by a rod 121 to a rack 122 which engages a pinion 123 fixed to a shaft 124, so that for every value of $P_2/P_1$ there is a corresponding value of angular displacement, $\phi$, of shaft 124. Fixed to shaft 124 is a cam 125, profiled so that the displacement of its cam follower 126 at any shaft rotation $\phi$ is proportional to the value of the measured $P_2/P_1$ corresponding to that rotation $\phi$. Attached to follower 126 is a rack 127, which engages a pinion 128 fixed to a vertical shaft 129, and thus imparts to shaft 129 an angular displacement proportional to the actual value of $P_2/P_1$ that prevails at the moment. It is to be noted that cams 95 and 125 are profiled to the same scale—i. e., a motion $\Delta$ of either shaft 99 or 129 represents the same increment of $P_2/P_1$.

The "error" in the compressor ratio $P_2/P_1$ is the difference between the permissible value of $P_2/P_1$, as indicated by the rotation of shaft 99, and the actual value of this ratio, as indicated by the rotation of shaft 129. Shafts 99 and 129 actuate the bevel gears of a differential gear 130, so that the "error" in $P_2/P_1$ is indicated by the movement of the cage of differential 130, as will be further described hereinbelow. Any movement of the cage of differential 130 displaces a pilot valve 131, by virtue of an arm 132 attached to said cage which contacts a rod 133 secured to valve 131. This valve is slidably mounted in a sleeve 134 which is supplied by a conduit 135 with fluid under pressure from pump 142 in reservoir 71. Sleeve 134 is connected, from points opposite the lands of valve 131 (when in neutral position), by conduits 136 and 137 to opposite ends of a cylinder 138 in which a piston 139 is slidably mounted.

Piston 139 is connected by a rod 140 to a main fuel by-pass valve 141 which controls the supply of fuel to main combustion chamber 5 of the engine by regulating the proportion of fuel that is shunted around fuel supply pump 40. From the foregoing arrangement it is clear that any movement of the cage of differential 130 displaces pilot valve 131, admits hydraulic fluid to one side of piston 139 and causes main fuel valve 141 to open or close in such a direction as to nullify the "error" in $P_2/P_1$ by admitting more or less fuel to the main combustion chamber 5 of the engine.

The mechanism as described above will maintain the main engine fuel flow at such a value during engine acceleration that compressor stall will not occur, independent of changes in compressor Mach number—that is, independent of changes in engine ambient conditions (altitude, temperature and airplane speed). Therefore, when cam 95 is contoured to suit the requirements of the engine with which the fuel control apparatus is to be used, the mechanism described above will prevent compressor ratio $P_2/P_1$ from exceeding the limit of stable operation, and at the same time permit maximum engine acceleration within the limiting conditions.

*Engine temperature control*

The purpose of the engine temperature control is to prevent excessive value of the temperature $T_3$ at the inlet of the turbine 13 during engine acceleration, and the mechanism for this purpose is shown in Figure 2 as associated with the acceleration fuel control mechanism described above.

In order to prevent the turbine temperature $T_3$ from rising to an excessive value, as compressor inlet temperature $T_1$ increases, it is necessary to reduce the permissible value of the compressor pressure ratio $P_2/P_1$, at each value of the ratio $N/\sqrt{\theta}$, in proportion to the inlet temperature $T_1$. ($\theta$ is the ratio to inlet temperature $T_1$ to the absolute sea-level temperature (Fahrenheit) of the standard atmosphere, i. e., $\theta = T_1/518.4°$ R.). This is achieved by providing in the shaft 129 a differential gear 143 whose displacement from its neutral position is proportional to $T_1$, the movement of the differential 143 being accomplished by an expandible bellows 144, responsive to compressor inlet temperature $T_1$, by its connection, through a conduit 145, with a bulb 146, located in air inlet 2 and containing a compressible fluid whose pressure varies linearly with the total temperature $T_1$.

As shown in the left center of Figure 2, the lower movable end of bellows 144 is connected by a rod 147 to the upper movable end of an evacuated bellows 148, and rod 147 is connected by a yoke 149 to a pilot valve 150 which is slidably mounted in a sleeve 151, supplied through a conduit 152 with hydraulic fluid under pressure from pump 142 in reservoir 71. Sleeve 151 is connected from points opposite the lands on valve 150 (when in neutral position) by conduits 153 and 154 with opposite ends of a cylinder 155 in which is slidably mounted a piston 156. A piston rod 157 carries at its free end a disk 158 on which is seated a spring 159, reacting against a disk 160, connected by a rod 161 to valve 150. The movement of rod 157 is transmitted by a yoke 162, a rod 163, and an arm 164 which is attached to the cage of differential 143. The mechanism 147—164 serves to amplify the thrust of bellows 144 and transmit said thrust to the cage of differential 143, so that the angular displacement of said cage is proportional to the total inlet temperature $T_1$.

The action of the temperature control mechanism is as follows:

Let $\Pi$ denote the permissible compressor pressure ratio $P_2/P_1$, as called for by the cam 95, and let $\pi$ be the actual compressor ratio indicated by the cam 125; $\Pi$ and $\pi$ being measured by the angular rotation of shafts 99 and 129 respectively. The interposition of the differential 143 causes the rotation of the portion of the shaft between differentials 143 and 130 to be equal to $\pi$ (but reversed in direction), as long as the differential 143 is at rest by being held against a stop 165, but equal to $(\pi + \alpha)$ when the differential 143 is rotated through the angle $\alpha/2$. Because of the action of the temperature bulb 146 and bellows 144, the rotation of the differential 143 is nearly proportional to the temperature $T_1$, say $\alpha = kT_1$, where $k$ is a constant.

In normal operation without the temperature sensitive element, the mechanism acts to make $\Pi = \pi$. When the temperature sensitive element is inserted, the mechanism acts to make $$\Pi = \pi + \alpha$$
$$= \pi + kT_1$$
or $\quad \pi = \Pi - kT_1$ That is, the compressor ratio $P_2/P_1$ developed by the engine is equal, at each value of $N/\sqrt{\theta}$, to the compressor ratio permitted by surging limitations, minus an amount proportional to compressor inlet temperature, $T_1$.

When the manual control lever 66 is advanced to a position calling for additional thrust, say from a low R. P. M. position, as shown in Figure 1, the engine should accelerate to the new R. P. M. as rapidly as possible. To achieve this optimum performance, as much fuel as can be burned must be injected into the combustion chamber 5, consistent with: (1) avoidance of compressor stall, and (2) avoidance of excessive turbine temperature. A close approach to this optimum performance is obtained by the temperature control shown in Figure 2, and described above.

*Engine speed control*

The manual speed control is shown in the upper left portion of Figure 2. A speeder spring 166, whose load is determined by the position of a manual cam 181, is arranged so that its downward force is opposed by the upward force due to a pair of flyweights 168, pivoted to a speed governor 169 which is geared to the main drive shaft 63 in fuel control apparatus 38. The force from the flyweights 168 is transmitted to speeder spring 166 through a sleeve 167, carrying a bracket 170, and disk 171 which serves as a seat for said spring.

Slidably mounted in sleeve 167 is a pilot valve 172 terminating at its upper end in a yoke 173, to which is attached a spring 174 whose tension is adjustable by a rod 175, threaded through a fixed bracket 176, and secured in adjusted position by a lock nut 177. Yoke 173 is provided with a slot 178 whose upper and lower ends are bevelled to knife edges which contact a lever 179, pivoted at 180. Bracket 170 is also similarly slotted to permit its limited vertical movement with sleeve 167, independent of lever 179. Cam 181 is eccentrically mounted on a shaft 182 which is connected to manual control shaft 64 in control apparatus 38, so that cam 181 is oscillated by control shaft 64 upon the movement of manual control lever 66 to which shaft 64 is connected. Upon rotation of cam 181, a cam follower 183, which is slidably mounted in a fixed sleeve 184, transmits a downward thrust through an adjustable screw 185 to a lever 186, pivoted at 187. The mid portion of lever 186 contacts a disk 188 which serves as a seat for the upper end of spring 166. Both lever 186 and disk 188 are centrally apertured to permit free movement relative to rod 175.

Sleeve 167 is slidably mounted in a fixed sleeve 189 and is supplied with hydraulic fluid under pressure from pump 142, through a conduit 190 and port 191. A second port 192 and a conduit 193 connect the interior of sleeve 167 with a cylinder 194, having a piston 195 connected through a rod 196, link 197, bell crank lever 198, and link 199, to lever 179.

To the right of piston 195 in cylinder 194 is a spring 200 which opposes the fluid pressure on the left of piston 195 and a conduit 201 permits fluid to flow from cylinder 194 to reservoir 71. A rod 202 attached to the right face end of piston 195 is adapted to contact an arm 203 which is fixed to the cage of a differential gear 204 connected to the shaft 99, when piston 195 is near the right end of cylinder 194. A stop 205 limits the travel of arm 203 to the left, so that upon movement of piston 195 from the right end of cylinder 194, rod 202 is withdrawn from contact with arm 203.

When sleeve 167 is in its neutral position, as shown in Figure 2, the upward force of flyweights 168 is exactly equal to the downward force of speeder spring 166 which in turn is determined by the position of cam 181. When sleeve 167 is in neutral position, the lower land portion of valve 172 exactly covers port 192, so that no fluid can flow into or out of the left end of cylinder 194.

During acceleration of the engine, the upward force of flyweights 168 is insufficient to overcome the increased force of spring 166, caused by counter-clockwise rotation of cam 181, which is so rotated by movement of control lever 66 to the right, and sleeve 167 is displaced downwardly, permitting fluid to escape from the left end of cylinder 194 through conduit 193, port 192, and sleeve 167, to reservoir 71; whereupon spring 200 moves piston 195 to the left and withdraws rod 202 from contact with arm 203, thus permitting the cage of differential 204 to be rotated to the left by arm 203 and a spring 206, until arm 203 comes against stop 205. A stop 207 is adapted to similarly limit the travel of arm 203 to the right. When the resulting increase in engine speed is sufficient to cause flyweights 168 to overcome the force of spring 166, sleeve 167 will be raised above its neutral position, admitting fluid to the left side of piston 195, and forcing rod 202 to the right, thereby engaging arm 203 and rotating the cage of differential 204 to the right (counter-clockwise direction, viewed from above). Shaft 99 remaining at rest, the rotation of the cage of differential gear 130 will rotate its upper bevel gear in a counter-clockwise direction (viewed from above), thereby actuating valve 131 and piston 139 to open main fuel by-pass valve 141, thus reducing the fuel flow to the engine and reducing its acceleration to zero.

The speed control just described is of the "on-off" type, and will exhibit steady hunting about the mean or desired value. To eliminate this hunting, one of the following types of speed control may be incorporated in the acceleration control system:

(1) Proportional, or permanent droop type of speed control.
(2) Integrating, or temporary droop type.
(3) Derivative, or anticipatory type.

It is assumed that the acceleration fuel flow to the engine is determined by some limiting feature of the engine in the present case by compressor pressure ratio, $P_2/P_1$, and turbine inlet temperature, $T_1$.

At some instant when the R. P. M. of the engine is near the value corresponding to the setting of the speeder spring 166, the governor "cuts in" to over-ride the limiting feature and reduce the fuel flow, the exact R. P. M. at cut-in being determined by the design of the unit and the kind of speed control being used. The following applies to the time after governor cut-in.

In the proportional control, the fuel flow is made proportional to the speed error. Since the fuel flow cannot be zero while the turbine is running, the speed error cannot be zero either. There is a permanent error, or droop in the R. P. M. A change of 1% in engine speed means a change of about 3% in overall engine thrust. Where this variation is permissible, the proportional type (permanent droop) speed control may be preferable, because of its extreme stability.

In the integrating type control, the fuel flow is proportional to the integral of the engine speed error, taken over the time the unit has been off speed. This type of control is desirable where the ambient conditions are fairly constant, but may exhibit extreme speed oscillations under certain conditions.

In the derivative type of control which is herein preferred, fuel flow is equal to the fuel flow that would be obtained with an "on-off" control, corrected by an amount that is a function of the rate of change of the speed error at each instant. The resulting effect is the same as if the governor were to cut in and start to reduce the fuel flow to the engine at an R. P. M. lower than what is called for by the speeder spring; the amount of anticipation of the governor cut-in being proportional to the acceleration. With a quick acting governor mechanism there is no initial overshoot of R. P. M., and the theoretical residual speed oscillations are of negligible magnitude, usually resulting in a steady R. P. M. with no perceptible oscillations.

The arrangement and mode of operation of the governor anticipator mechanism shown in Figure 3 is as follows. On a drive shaft 208, rotated by main drive shaft 63 at a speed proportional to engine R. P. M., there is mounted an inertia weight 209 which is geared to shaft 208 through a differential gear 210 in the manner indicated in Figure 3, so that when the cage 211 of the differential is held fixed, inertia weight 209 rotates at the same R. P. M. as the drive shaft 208, but in the opposite direction.

In Figure 3, the cage 211 of the differential 210 is shown as restrained by a pair of torque springs 212. As long as the angular velocity of the system remains constant, these torque springs will remain at rest, since no torque is being transmitted through the differential 210 except for a small steady frictional torque. When shaft 208 experiences an acceleration, inertia weight 209 will try to lag behind, and an accelerating torque will be transmitted through the differential 210 to maintain equality of speed between inertia weight 209 and the drive shaft 208. The torque thus transmitted will deflect the torque springs 212. The cage 211 of the differential, and the arm 213 attached thereto, will therefore be deflected from their normal positions, and acting through a bell crank lever 214, pivoted to a fixed bracket 215, and a yoke lever 216, pivoted at 217, will exert an upward or downward force on the governor stem 169.

During acceleration the force due to the torque springs 212 will add to the upward force on the governor stem 169, due to the centrifugal force of the flyweights 168, and governor "cut-in" will therefore occur at a lower R. P. M. than would otherwise be the case. During deceleration, the reverse will occur, and cause the governor to "cut-out" at a slightly higher speed than would otherwise occur. The action of the inertia weight 209 is to make the governor think it is rotating faster than it really is, and the governor cuts in to reduce fuel flow at some R. P. M. less than that for which the speeder spring 166 is set. As the acceleration of the engine rotor approaches zero, the angular displacement of the torque springs 212 also approaches zero, thus removing the anticipatory effect of the governor on stem 169, and allowing the engine R. P. M. to attain its desired steady state value.

The control of deceleration fuel flow by the deceleration fuel control device will be discussed after a description of the variable area exhaust nozzle control.

Variable area exhaust nozzle control

The important points in the effect of varying the area of exhaust gas nozzle 27 (Figure 1) on the performance of the engine, may be summarized as follows:

(1) During acceleration, as much as possible of the energy of the fuel should be applied to accelerating the engine rotor, and the kinetic energy of the exhaust jet should be minimized. Therefore, when the engine is accelerated the exhaust nozzle area should be increased.

(2) When running at steady R. P. M. in the "cruise" range, the engine economy should be at its maximum. The exhaust nozzle area should be adjusted so that the engine steady state operating point at that particular R. P. M. is pushed to the point of maximum economy.

(3) When running at full R. P. M. in the maximum dry thrust range, the additional thrust over and above what is obtained at maximum economy, can be provided only by increasing the velocity of the exhaust jet. Maximum dry thrust, therefore, requires reduction in the exhaust nozzle area.

(4) In the afterburning range the tailpipe total pressure $P_4$ cannot be permitted to exceed the value at maximum dry thrust under the same ambient conditions, or else the limitations of the primary engine will be exceeded. To obtain increased thrust from afterburning, the exhaust nozzle area must be increased.

The mechanism for varying the area of exhaust nozzle 27, as shown in the central portion of Figure 2, comprises a conventional pair of eyelids 28 and 29, actuated by a hydraulic piston 34, and the actuating liquid is admitted to the cylinder 35 through a pilot valve 220, external to the control apparatus 38, which valve is supplied with liquid under pressure by a conduit 223, connected to the engine lubricating system, or other source of pressure (not shown). The pilot valve 220 is energized to open or close eyelids 28, 29 by hydraulic fluid received from control apparatus 38. In the range of operation up to full R. P. M. maximum economy, the positioning of the eyelids 28, 29 for acceleration and for steady running is effected automatically by control apparatus 38 in the manner described below.

During steady running, except in augmented thrust at full R. P. M., the area of exhaust nozzle 27 should be adjusted by the position of eyelids 28, 29, so that the steady operating condition at that R. P. M. results in maximum economy, which may be defined as operation at such a rate of fuel consumption that the airplane will have a greater range than at any other fuel consumption. At each engine R. P. M., there is a value of thrust, F, at which the specific fuel consumption in pounds per hour per pound of thrust is a minimum, and this value of thrust at the particular R. P. M. corresponds to a certain exhaust nozzle area, $A_5$.

It has been well established that for any given airplane weight there is a definite relation between the "dimensionless" air speed, $u_0/\sqrt{T_1}$, and required corrected thrust $F/P_1$, (where $u_0$ is airplane speed, and $T_1$ and $P_1$ are respectively the total temperature and pressure of the air in the compressor inlet (2); and also, for each value of nozzle area, $A_5$, and corrected engine speed (R. P. M.), $N/\sqrt{T_1}$, there is a unique relation between corrected thrust, $F/P_1$, and corrected air speed, $u_0/T_1$. The nature of the relationship is shown by the curves of Figure 4. For example, assume that the airplane speed and weight are such that the operating point is as denoted by "X" in Figure 4. Then for any value of corrected engine speed (R. P. M.), $N/\sqrt{T_1}$ there is just one value of exhaust nozzle area, $A_5$, that will result in the desired corrected thrust, $F/P_1$ at the point X.

The nozzle area control is arranged so that for any value of $N/\sqrt{T_1}$ the eyelids 28, 29 will be positioned to give a nozzle area, $A_5$, such that the economy, say in pounds of thrust per pound of fuel, is a maximum. When this is done, the airplane may be unflyable at the particular air speed desired when the R. P. M. is arbitrarily selected, and for operation at a point such as X in Figure 4 it may be necessary to adjust the cruising R. P. M. But such a control will result in maximum economy at each selected steady flight condition.

From a general analysis of steady operating conditions, it is known that maximum economy at each airplane operating condition necessitates a unique pair of values of nozzle area, $A_5$, and corrected R. P. M., $N/\sqrt{T_1}$. From this it follows that at each corrected R. P. M., there is a compressor pressure ratio, $P_2/P_1$, corresponding to maximum engine economy, and based upon this correlation, the exhaust nozzle area control system shown in Figure 2 is arranged to position the exhaust nozzle eyelids 28, 29, at each corrected R. P. M., so as to maintain the compressor pressure ratio, $P_2/P_1$, at a preselected value.

The mechanism for controlling the area of exhaust nozzle area, 27, as shown schematically in the upper central portion of Figure 2, is as follows.

On shaft 94 are fixed cams 224 and 225. Contacting cam 224 is a follower 226 having a rack 227 which engages a pinion 228, fixed to a vertical shaft 229 to which are connected three differential gears 230, 231 and 232. The cage of differential 230 carries an arm 233 which is adapted to contact a variable stop 234, carried by an arm 235 on a cam follower 236 whose position is determined by the contour of cam 225. Attached to the cage of differential 230 is an arm 237, adapted to contact a fixed stop 238. Similarly, the cage of differential 232 carries an arm 239 which is adapted to contact a fixed stop 240; and the cage of differential 231 carries an arm 242, adapted to contact a rod 243, attached to a valve 244 which is slidably mounted in a sleeve 245, connected by conduits 221 and 222 with pilot valve 220 and supplied by a conduit 246 with fluid under pressure from pump 142.

A cam 247 fixed to shaft 124 has a follower 248, integral with a rack 249 which meshes with a pinion 250 fixed on shaft 241, so that the rotation of shaft 241 by shaft 124, and vice versa, is a function of the contour of the cam 247.

For the time being, the effect of the differential gears 230 and 232 is disregarded by assuming them to be held against stops 238 and 240 by springs (not shown).

Following the pattern outlined above, the exhaust nozzle area control positions eyelids 28, 29 so that at each corrected R. P. M., $N/\sqrt{T_1}$, there is a predetermined value of compressor ratio, $P_2/P_1$, corresponding to maximum economy. From a curve of compressor ratio for maximum economy vs. corrected R. P. M., cam 224 is contoured in such a way that for each value of $N/\sqrt{T_1}$ indicated by the angular position of the shaft 94, there is a position of the cam follower 226, and an angular displacement of the nozzle control shaft 229. The angular displacement of shaft 229 is a measure of the compressor ratio, $P_2/P_1$, for maximum economy at the particular value of $N/\sqrt{T_1}$. The actual value of the compressor ratio, $P_2/P_1$, existing in the engine is indicated by the angular displacement of a shaft 241, connected to differentials 232, 231 and 230, in the same manner as was described in columns 7–9 above, in connection with the control of engine fuel flow during acceleration. When the desired value of $P_2/P_1$, indicated by the rotation of shaft 229 is different from the actually existing value indicated by the rotation of the shaft 241, the cage of the differential 231 is displaced from its neutral position, opening valve 244, and admitting hydraulic fluid to the actuating pilot valve 220 to adjust the position of the nozzle eyelids 28, 29. If the actual, $P_2/P_1$, is excessive, the eyelids 28, 29 will open; if deficient, the eyelids will close until equality is re-established between the desired and the actual values of compressor ratio, $P_2/P_1$.

In the preceding paragraph it is assumed that the engine is running at steady R. P. M. In this case the fuel flow to the engine is determined by the action of speed governor 169, as described hereinabove, and the governor will over-ride the acceleration control, so that the fuel flow to the engine is what is needed to maintain the R. P. M., regardless of how the exhaust nozzle area and pressure ratios may vary. When the engine is accelerating, the governor power piston 195 is withdrawn, and the fuel flow to the engine will be determined by the acceleration control mechanism. The compressor ratio, $P_2/P_1$, called for by the acceleration cam 95 will be greater than what is permitted by the steady running cam 224 of the exhaust nozzle area control. The actual compressor ratio signal given to the nozzle area control is therefore in excess of what this control permits, and it therefore goes to work to try and reduce the compressor ratio by opening the eyelids 28, 29. We have already seen that a large exhaust nozzle area is required for rapid acceleration, and this feature is provided automatically in the way just described.

Conversely, during deceleration of the engine, the kinetic energy of the jet stream should be maximized at the expense of rotor kinetic energy. To achieve this the exhaust nozzle is closed. When the manual control lever 66 is moved in the retarding direction, the governor power push rod 202 acts on the differential 204 to effectively reduce the permissible $P_2/P_1$ signal. The acceleration fuel control then acts to reduce the engine fuel supply until the actual, $P_2/P_1$, is reduced to this smaller value, as called for by the governor 169 and the cam 95 jointly. In this new state, the actual compressor ratio, $P_2/P_1$, indicated to the cam 247 of the nozzle area control is less than what is permitted by the cam 224. This inequality upsets the equilibrium of the differential 231 and the valve 244, and the mechanism works to reduce the exhaust nozzle area in an attempt to raise the actual compressor ratio to equality with the compressor ratio called for by cam 224. Closing the exhaust nozzle 27 has the effect of increasing the jet velocity and making the engine decelerate more quickly, which is what is desired.

At some value of turbine inlet temperature $T_3$, say 1725° R., the magnitude of its ratio to compressor inlet temperature, $T_3/T_1$, decreases with increasing compressor inlet temperature, $T_1$. For example, when $T_1$ is 520° F. (60° F.), the value of $T_3/T_1$ may be 3.33. Suppose the steady R. P. M. operating value of $P_2/P_1$ is 4.00 for maximum economy at this time, and the exhaust nozzle control is arranged to maintain the pressure ratio, $P_2/P_1$, at a value of 4.00. If now the compressor inlet temperature, $T_1$, should increase to 610° R. (150° F.) the magnitude of $T_3/T_1$ would remain at 3.33, and $T_3$ would increase to 2030° R., which is greater than the maximum permissible turbine inlet temperature for steady running, or even for short time transients. With the nozzle area control as shown in Figure 2, there is required a temperature over-ride to prevent the turbine temperature from exceeding maximum permissible values when the ambient conditions are unfavorable. At high inlet temperatures the actual compressor ratio must be reduced in relation to the value permitted by economy conditions alone. This feature is provided by incorporating a differential gear 232, the cage of which is subject to displacement in proportion to $T_1$, when $T_1$ exceeds some initial value below which turbine temperature in steady state running is not a limiting factor. The required displacement of the cage of differential 232 is effected by a push rod 251 which is attached to the yoke 162 of the $T_1$ temperature amplifying device shown in the upper right-hand portion of Figure 2; rod 251 being adapted to contact arm 239 attached to the cage of differential 232, when the temperature $T_1$ reaches a predetermined value, and rotate said cage to the left.

The foregoing paragraphs described the method of automatically controlling the exhaust nozzle area to
(1) Provide for maximum cruise economy at steady R. P. M.,
(2) Provide for most rapid acceleration,
(3) Provide for most rapid deceleration, and
(4) Protect against excessive turbine temperature at steady R. P. M.

In addition, the exhaust nozzle area control must incorporate provision for
(5) Development of additional thrust up to maximum dry thrust, and
(6) Development of augmented thrust by tailpipe after-burning.

Before describing how these last two features are provided in the control, a description of engine deceleration fuel control will be given.

*Deceleration fuel control*

At any engine speed, N, the fuel flow to combustion chamber 5 (Figure 1) must not fall below a certain magnitude if extinction of the flame is to be avoided. The minimum magnitude of the lean blowout fuel flow is of course variable with altitude. In the control system disclosed herein, the region of lean blowout is avoided by providing at each $N/\sqrt{T_1}$, that the minimum compressor ratio, $P_2P_1$, cannot fall below a certain percentage of the maximum allowable compressor ratio for that particular value of $N/\sqrt{T_1}$. The percentage is chosen so that the minimum compressor ratio will correspond to a turbine temperature ratio always in excess of the minimum blowout value for the worst ambient conditions.

The meaning of this is shown by the diagram in Figure 5. A certain line, A, can be drawn on the diagram to represent the relation between $N/\sqrt{T_1}$ and $P_2/P_1$ for acceleration, or maximum output conditions. Another line, B, can be drawn to represent the relation between $P_2/P_1$ and $N/\sqrt{T_1}$ below which lean blowout may occur. A deceleration line, C, is drawn so that it is above all points on the lean blowout line, B, and each $P_2/P_1$ on the lean blowout line has a certain fixed ratio to the corresponding $P_2/P_1$ on the acceleration line. The mechanism by which this is attained is shown in Figure 6. It is omitted from Figure 2 for simplicity.

On the shaft 99 is mounted a gear 252 which rotates with the shaft. Also mounted on the shaft 99 is a gear segment 253, coaxial with, but free to rotate on, said shaft. Gears 252 and 253 are connected through gears 254 and 255. Suppose the shaft 99 experiences an angular displacement "$\phi$," due to the action of the cam 95. The angle $\phi$ then represents a permissible pressure ratio, $P_2/P_1$, which must not be exceeded for reason of compressor stall. If "$k$" represents the gear ratio of the gearing 252—255, then the loose gear 253 experiences a rotation $k\phi$. Now when the governor 169 cuts in during deceleration, the push rod 202 moves to the right, and engages the arm 203 on the cage of differential 204, pushing it round until it strikes the variable stop 256 shown on the loose gear 253. The cage of the differential 204 has thus rotated through the angle $k\phi$. While this is happening, the shaft 99 is at rest, since $N/\sqrt{T_1}$ has not changed. The angular displacement of the lower end of vertical shaft 99 (below the differential 204) is no longer $\phi$, but it has now some new value, $\phi'$, where $$\phi' = \phi - 2k\phi$$

or $$\phi'/\phi = (1 - 2k)$$

The angle, $\phi'$, corresponds to some new permissible value of compressor pressure ratio, $P_2/P_1$, to which the engine fuel flow will adjust itself, and by the above equation, the new compressor ratio at full governor cut-in is $(1-2k)$ times the permissible acceleration compressor ratio. For example, if the gear reduction $k$ is 1:8, then full cut-in of the governor will reduce $P_2/P_1$ to 75% of the permissible acceleration.

The governor power piston rod 202 in Figure 6 is shown as collapsible. This is to limit the force exerted and to prevent the fluid pressure behind the power piston 195 from acting through the gearing to pull the cam follower 96 away from the cam 95.

At full governor cut-in, the exhaust nozzle area decreases in the manner described above, to increase the rate of deceleration.

*Variable area exhaust nozzle control (maximum dry thrust)*

Returning now to a further consideration of the variable area exhaust nozzle control, it will be noted from Figure 1 that moving the manual control lever 66 beyond the position corresponding to maximum engine speed (R. P. M.) increases the thrust developed, up to the maximum dry thrust of the engine, which is defined as the maximum thrust that can be developed by the engine, without tailpipe afterburning and without exceeding permissible limits of compressor stability, turbine temperature and R. P. M. With the control system disclosed herein, additional thrust is developed by manually closing the exhaust nozzle to an area less than what is called for by the maximum economy cam of the nozzle area control, while maintaining the engine R. P. M. at a maximum value. The tailpipe pressure and jet velocity are thereby increased, with consequent additional thrust.

The mechanism for achieving this is shown in the upper central portion of Figure 2. A part of the nozzle area control is shown a push rod 257. When the control lever 66 is advanced beyond the position on scale 67 corresponding to full R. P. M., push rod 257 engages arm 237 attached to the cage of differential 230, and rotates the shaft 229 (between the differentials 230 and 131) in a direction to call for increased compressor ratio, $P_2/P_1$. The consequent movement of differential 231 and valve 244 is such as to close the exhaust nozzle 27 until the actual pressure ratio indicated by the cam 247 is in balance with the increased value called for by cam 95 plus the manual push rod 257.

The compressor ratio $P_2/P_1$ developed by the engine cannot be permitted to exceed the stability limit of the compressor. Protection against this contingency is provided by the variable stop 234 actuated by cam 225. The angular rotation of the shaft 229, below the differential 230, must be limited to a value corresponding to the maximum permissible compressor ratio $P_2/P_1$. Since the maximum permissible compressor ratio is a function of $N/\sqrt{T_1}$, the position of the variable stop 234 is suitably related to $N/\sqrt{T_1}$ so that the angular rotation of the shaft 229 when motivated by the manual control is restricted in the desired manner. To prevent damage due to excessive forces, the manual push rod 257 is telescoped in a manner similar to what was shown in Figure 6 for the governor push rod 202. This will, under some conditions, introduce a short dead band into the manual lever 66 when in the manual dry thrust range. That is, it will be possible to move the lever a few degrees at the end of its travel in the dry thrust range without a corresponding increase in thrust. The engine, however, will be then developing all the dry thrust of which it is capable without damage. The temperature over-ride 145—162 is operative in the dry thrust manual region to prevent excessive turbine temperatures. The control just described permits an infinitely variable selection of dry thrust in proportion to the position of the manual lever 66.

*Afterburner fuel control*

The control system herein disclosed comprises the use of a separate fuel pump 50 for the afterburner fuel supply (see Figures 1 and 2), and a separate fuel control therefor, but built into and integrated with the main engine control. The arrangement for this is as follows.

As shown in Figure 7, a gate 260 leading into an afterburner range slot 261 is provided in the pilot's control quadrant 68, at the position corresponding to maximum R. P. M. maximum dry thrust. Moving the control lever 66 into the gate 260 brings it into contact with a push rod 262 which is held in the position shown in Figure 7 by a spring 263, interposed between a collar on rod 262 and a bracket 264 attached to quadrant 68, until a further leftward movement of lever 66 causes rod 262 to be pushed to the left. The end of rod 262 is connected by a suitable linkage (not shown) to a manual shut-off valve 270 in the afterburner fuel supply line 52—53 (Figure 2), so that upon displacement of rod 262 to the left by the entrance of handle 66 into slot 261, the afterburner manual shut-off valve 270 is opened. Upon movement to the left, rod 262 is also adapted by suitable means (not shown) to energize the afterburner ignition system. Movement of the manual lever 66 in the afterburner range slot 261 causes increasing fuel flow in proportion to the movement of the lever. As the fuel flow increases, the nozzle area control automatically increases the area of nozzle 27 to permit the escape of the increased volume of exhaust gas, while holding the output of the primary engine at its maximum value.

The construction and operation of the afterburner fuel control system is as follows.

The afterburner fuel control, as shown at the right center of Figure 2, comprises a simple ratio device to maintain the fuel nozzle pressure $p_F$ in afterburner nozzles 19 (Figure 1) proportional to compressor inlet total pressure $P_1$, although this could just as well be compressor rise, $P_2-P_1$, atmospheric static pressure, $p_0$, compressor discharge pressure, $P_2$, whichever will give the most satisfactory metering.

The function of the afterburner fuel control is to reduce the afterburner fuel flow to the engine in proportion as the mass air flow through the engine is reduced with increasing altitude. An external flow divider 54 maintains the fuel flow to the afterburner nozzles 19 proportional to fuel pressure in conduit 53 and the fuel metering is done by the flow divider 54 and nozzles 19. The pressure $p_F$ of the fuel relative to $P_1$ is determined by the position of the manual lever 66, in the following manner. The release of heat in the afterburner, at a given area of exhaust nozzle 27, serves to raise the pressure in the tailpipe 26 and to raise the compressor pressure ratio $P_2/P_1$. Without the interposition of the nozzle (27) area control, a drop in engine speed would result, and the governor 169 would act to increase the engine fuel flow to maintain the R. P. M. The increase in compressor pressure ratio, however, is detected by the nozzle area control, which acts to increase the area of nozzle 27 in a way that maintains the compressor ratio constant. Since at given ambient conditions constancy of compressor ratio and engine speed (R. P. M.) entails constancy of tailpipe pressure $P_4$ and temperature $T_4$, the increase in thrust due to afterburning is proportional to the increase in the area of nozzle 27.

Again, when the nozzle area control is arranged to hold the compressor pressure ratio constant, the amount of fuel needed by the afterburner is, at any exhaust nozzle area, almost linearly proportional to the compressor inlet total pressure $P_1$. In other words, if at some set of ambient engine conditions (airplane speed, etc.) the afterburner manual control shaft 271 (Figure 2) is placed in some arbitrary position, the fuel flow to the afterburners is determined. To maintain the primary engine at its maximum output (as defined by the compressor ratio called for by the cam 225), the exhaust nozzle area must be adjusted to a proper value. If now the altitude of the airplane should change, giving a new value of compressor inlet pressure, $P_1$, a new value of afterburner fuel flow is required, the necessary change in fuel flow being proportional to the change in $P_1$. If this alteration in fuel flow is not provided, the exhaust nozzle area will be changed by the control mechanism, and the degree of thrust augmentation (as a percentage of the maximum dry thrust available) will change very radically. Since it is undesirable to require the pilot to adjust his control lever 66 with changing altitude, the required variation in afterburner fuel flow with altitude is provided by the control mechanism in a manner to be described.

Referring to Figure 2; the afterburner fuel control is shown at the extreme right. Fuel is supplied by a positive displacement pump 50, and flows to the afterburners 19 through manual shut-off valve 270 and flow divider 54. The portion of the pump delivery that is not required by the afterburners is by-passed to the boost or inlet side of the pump through conduit 58 and a bellows actuated relief valve 272.

The pressure $p_F$ in the fuel line 58 is applied to the underside of a small diaphragm 273 of effective area $A_D$. The diaphragm 273 exerts an upward force on the lower lever 274 (pivoted at 275) of a "nutcracker" arrangement, and the upward movement of this lever is opposed by the downward force of a roller 275, mounted at one end of a push rod 276 that follows a cam 277 fixed on the shaft 271, by virtue of a tension spring 278 which is connected to rod 276 and casing 279 of the afterburner control.

The upper lever 280 (pivoted at 281) of the nutcracker is arranged as shown, with an evacuated bellows 282 at the left-hand end, and a balancing spring 283 at the right-hand end. When the nutcracker is in its neutral position, as shown in Figure 2 (i. e., with the upper lever level), the spring force due to elasticity in the bellows 281 is just balanced by the spring force due to the spring 283. The exterior of the bellows 282 is exposed to the compressor inlet pressure, $P_1$, which enters casing 279 through a conduit 284, connected to air inlet 2 by conduit 61.

With the dimensions shown in Figure 2, and for positions of the nutcracker near the "neutral" position, equilibrium of the system is defined by the following:

Equilibrium of the upper lever 280:

$$P_1 A_B a/x = X$$

where X is the upward force exerted by the nutcracker roller 275.

Equilibrium of the lower lever 274:

$$p_F A_D c/y = X$$

Equating these two expressions for X:

$$p_F = P_1 \left[ \frac{A_B a}{A_D c} \frac{y}{x} \right] \quad (1)$$

So, for any value of "x," the fuel pressure $p_F$ varies linearly with compressor inlet pressure $P_1$, since everything in the right-hand side of the above equation is constant except $P_1$.

In this description, the fuel pressure $p_F$ is taken to be gage pressure (with respect to $P_1$). It would be possible to balance out the effect of $P_1$, acting on the top side of the fuel diaphragm 273, but since the fuel is injected into a region 26 where the total pressure, $P_4$, is perhaps 1.6 times $P_1$, and since (by the action of the flow divider) the fuel flow is proportional, not to the absolute pressure $p_F$, but to $(p_F - P_4)$, any compensation for $P_1$ would also necessitate compensation for $P_4$, and the advantages to be gained by this refinement would not justify the complexity.

Linearity between $p_F$ and $P_1$ prevails when the nutcracker is near its neutral position. Departure of the nutcracker from its neutral attitude introduces restoring forces. Attached to the fuel diaphragm 273 is a small valve 285. If the nutcracker equilibrium is disturbed, valve 285 either opens or closes. Assume, for example, that the compressor inlet pressure $P_1$ increases. Then for the moment, the pressure $p_F$ is insufficient to maintain the nutcracker in balance, and the fuel diaphragm 273 is depressed slightly to open the valve 285. This admits fuel through a conduit 286 and a passage 287 to the interior of a fuel bellows 288, attached to valve 272. The change in the ratio of the area of the valve 285 opening, to the area of a small restriction 289, in a conduit 290 connecting conduit 287 with a chamber 291, at the same time increases the pressure in the passage 287 and in the interior of bellows 288. The balance of the relief valve 272 is therefore disturbed, and said valve will close slightly, reducing the quantity of fuel by-passed around pump 50, and raising the pressure $p_F$ in the fuel line 58. The increased pressure $p_F$ is sensed by the fuel diaphragm 273, and the increased fuel pressure restores equilibrium to the nutcracker, maintaining linear proportionality between $P_1$ and $p_F$ as required.

The mechanism described is a regulating device, and does not depend on the accuracy of valve contouring or on maintaining accurate ratios between valve and bellows areas. The constant of proportionality between $P_1$ and $p_F$ is determined, for any dimensions of bellows and diaphragms, by the lengths of the lever arms $a$, $b$, and $c$, which can readily be adjusted to give almost any desired constant of proportionality.

The degree of thrust augmentation provided by afterburning is determined by the quantity of fuel injected into the tailpipe 26, which again is proportional to the fuel pressure $p_F$ generated by the afterburner fuel control. The amount of thrust augmentation is selected by the position of the manual lever 66, which varies the position of the nutcracker roller 275 by virtue of cam 277 and follower 276, to select the constant of proportionality in Equation 1 above. The exact relation between percentage of maximum thrust and manual lever 66 position is determined by the contouring of the afterburner manual cam 277.

The afterburner fuel control just described is responsive only to manual lever 66 position and to compressor inlet pressure, $P_1$. A variation in compressor inlet temperature $T_1$, other conditions (R. P. M., barometric pressure and airplane speed) being kept constant, will result in a variation in the mass of air flowing through the engine. A given quantity of fuel injected to the afterburners 19 will, with increased $T_1$, therefore result in a higher afterburner temperature rise, and an increased volume flow through the exhaust nozzle 27. Considered by itself, then, the effect of increasing $T_1$, with the afterburner manual control in a fixed position, is to raise the tailpipe pressure $P_4$ and consequently the compressor pressure ratio $P_2/P_1$. This increased pressure ratio will be sensed by the exhaust nozzle (27) control, and under this high inlet temperature condition the exhaust nozzle area will be greater than normal. This effect is in addition to the action of the differential 232 in the nozzle area control mechanism, which is for the purpose of protecting the turbine from excessive temperature. With high values of compressor inlet temperature $T_1$, the nozzle (27) area control acts through differential 232 to reduce the permissible compressor ratio in the primary engine. When in the afterburning range, high inlet temperatures tend to raise the tailpipe pressure $P_4$. This tendency is sensed by the compressor ratio device, which acts independently through the cam 247 to open the exhaust nozzle 27 and reduce the tailpipe pressure $P_4$ to a normal value.

The control herein described is such that afterburning is not initiated until the manual control lever 66 is in the thrust augmentation position, and the lever cannot be placed in thrust augmentation until it has passed through the maximum dry thrust position. With the arrangement proposed, failure of the afterburner fuel system to initiate thrust augmentation leaves the system operating at maximum dry thrust. Blowout of the afterburners when the manual control lever 66 is in any augmented thrust position leaves the basic engine operating with excessive exhaust nozzle area. The immediate effect is an instantaneous increase in turbine temperature and pressure drop, which applies a large accelerating torque to the engine rotor. The instantaneous or "step" increase in accelerating torque produces a large initial acceleration, which is sensed by the anticipating device on the speed governor 169. The anticipator (Figure 3) gives a good push to the governor valve sleeve 167, which rapidly acts to reduce the fuel flow to the engine. At the same time, the sudden drop in tailpipe pressure $P_4$ results in a drop in compressor ratio $P_2/P_1$, which acts on the nozzle (27) area control to close the eyelids 28, 29. The closing of the eyelids has a strong decelerating effect on the engine, and the R. P. M. and thrust, through the action of the speed governor 169 and the exhaust nozzle (27) control, are rapidly re-established at the values corresponding to maximum dry thrust.

In operating the engine with the single lever control described herein, the lever 66 should not be moved beyond the maximum R. P. M. position on scale 67 of quadrant 68 until the full R. P. M. is attained. Provided that the permissible compressor ratio which defines the maximum engine output during thrust augmentation is at each corrected R. P. M. less than the compressor ratio permitted during acceleration, nothing serious will happen if this rule is ignored. Thus, for example, assume that the engine has been cranked up and fired, and has come up to idle speed with the control lever 66 in the idle position. Now suppose the lever 66 is suddenly thrust forward to the gate 260 that defines maximum dry thrust. The depression of the governor speeder spring 166 will throw the engine fuel control on to the acceleration control, and at the same time the nozzle area control will be thrown onto the cam 225. Provided that the $P_2/P_1$ permitted by the cam 225 is less than is permitted by the cam 95, the nozzle area control will always be sensing a pressure ratio greater than it allows, and to correct this condition it will open up the exhaust nozzle 27. This will permit the engine to accelerate up to maximum R. P. M. in the usual way, and when full R. P. M. is attained the nozzle area control will take over to adjust the eyelids 28, 29 to the maximum thrust position.

Even if the pilot's control lever is pushed from the idle position into the afterburning range 261, the engine will survive the ordeal with no serious consequences, except perhaps slow acceleration. This again is provided that the cam 225 calls for a lesser compressor ratio than the cam 95. The hazard in this case is that the air flow through the engine may be insufficient to burn the fuel being provided by the afterburner control. In this case, the tailpipe temperatures may get ahead of the tailpipe cooling provisions, resulting in possible damage, or perhaps afterburning may start up with explosive violence. To avoid unwitting initiation of afterburning, the gate 260 in the control quadrant 68 is provided, and this afterburning cannot be started until the engine is turning over at a suitable speed.

Between inlet conduit 43 and outlet conduit 44 in control apparatus 38 is a manual shut-off valve 292 which is actuated by a spring 293 and a cam 294, eccentrically mounted on a shaft 295 that is connected to manual control shaft 64, so that when manual control lever 66 is pulled back to its extreme left (cut-off) position on scale 67 of quadrant 68, valve 292 is completely closed and shuts off all fuel flow to the main engine. As lever 66 is advanced, valve 292 is quickly opened, so as not to affect the flow of fuel as regulated by control apparatus 38.

Similarly, manual shut-off valve 270 in the afterburner fuel line 52—53 is actuated by a spring 296 and a cam 297, eccentrically mounted on a shaft 298 which is connected to manual control shaft 64, so that when manual control lever 66 is in any position to the left of the point of maximum dry thrust on scale 67 of quadrant 68, valve 270 is completely closed and shuts off all fuel flow to afterburners 19. As lever 66 is advanced beyond the point of maximum dry thrust in slot 261 of quadrant 68, valve 270 is quickly opened, so as not to affect the flow of afterburner fuel as regulated by the afterburner fuel control.

Casing 70 of fuel control apparatus 38 has a filling hole and plug 299 and a drain hole and plug 300. When it is desired to operate fuel control apparatus 38 with a liquid under pressure separate from the fuel supply system, plug 299 is removed and casing 70 is connected to a source of liquid under pressure (e. g., the lubricating system of the engine) by a conduit (not shown) threaded into the opening for plug 299. Casing 70 is also provided with an inlet 301, which connects with fuel conduit 43 and has a manually controlled valve 302, as shown in Figure 2. When it is desired to operate the working parts of said apparatus by fuel from the fuel supply system of the engine, plug 300 is removed to permit draining of casing 70, and plug 299 is reinserted as shown in Figure 2. Valve 302 is then opened to permit fuel to flow from conduit 43 into casing 70.

While I have shown and described the preferred embodiment of my invention, I desire it to be understood that I do not limit my invention to the details of construction disclosed by way of illustration, as these may be changed and modified in form and arrangement by those skilled in the art without departing from the spirit of my invention nor exceeding the scope of the appended claims.

I claim:

1. For an aircraft turbo-jet engine having a main combustion chamber, and an air compressor and a fuel pump for respectively supplying air and fuel thereto; a fuel control apparatus comprising a unitary, hermetically-sealed casing containing therein: first means, responsive to airplane altitude and speed and ambient air temperature, for regulating the fuel flow to said chamber in accordance with a selected schedule of fuel supply corresponding to varying conditions of airplane altitude and speed, and ambient air temperature; and second means, responsive to airplane altitude and speed and ambient air temperature, for regulating said fuel flow so as to obtain a selected maximum flow during engine acceleration, consistent with preventing compressor stall, under said varying conditions.

2. Fuel control apparatus according to claim 1, including a manual control lever, and means controlled by said lever, for coordinating the functioning of both said regulating means.

3. For an aircraft turbo-jet engine having a main combustion chamber, and an air compressor and a fuel pump for respectively supplying air and fuel thereto; a fuel control apparatus comprising a unitary, hermetically-sealed casing containing therein: first means, responsive to airplane altitude and speed and ambient air temperature, for regulating the fuel flow to said chamber in accordance with a selected schedule of fuel supply corresponding to varying conditions of airplane altitude and speed, and ambient air temperature; second means, responsive to airplane altitude and speed and ambient air temperature, for regulating said fuel flow so as to obtain a selected maximum flow during engine acceleration, consistent with preventing compressor stall, under said varying conditions, and means, responsive to engine temperature, for preventing engine temperature from exceeding a selected maximum value during such engine operation.

4. For an aircraft turbo-jet engine having a main combustion chamber, and an air compressor and a fuel pump for respectively supplying air and fuel thereto; a fuel control apparatus comprising a unitary, hermetically-sealed casing containing therein: means for regulating the fuel flow to said chamber in accordance with a selected schedule of fuel supply corresponding to vary-conditions of airplane altitude and speed, and ambient air temperature; a manual control lever, and means, proportionately responsive to airplane altitude and speed, ambient air temperature, and to said manual control lever for maintaining a substantially constant, selected engine speed, corresponding to a selected position of said lever, under said variable engine operating conditions, at any selected speed between idle and a predetermined maximum permissible engine speed.

5. Fuel control apparatus according to claim 4, including means controlled by said lever for coordinating the function of all of said means.

6. For an aircraft turbo-jet engine having a main combustion chamber, and an air compressor and a fuel pump for respectively supplying air and fuel thereto; a fuel control apparatus comprising a unitary, hermetically-sealed cased containing therein: means for regulating the fuel flow to said chamber in accordance with a selected schedule of fuel supply corresponding to varying conditions of airplane altitude and speed, and ambient air temperature; means for regulating said fuel flow so as to obtain a selected maximum flow during engine acceleration, consistent with preventing compressor stall, under said varying conditions; a manual control lever, and means, proportionately responsive to airplane altitude and speed, ambient air temperature, and to said manual control lever for maintaining a substantially constant, selected engine speed, corresponding to a selected position of said lever, under said variable engine operating conditions, at any selected speed between idle and a predetermined maximum permissible engine speed.

7. Fuel control apparatus according to claim 6, including means controlled by said lever for coordinating the functioning of all said means.

8. For an aircraft turbo-jet engine having a main combustion chamber with fuel burner nozzles therein, and an air compressor and a fuel pump for respectively supplying air and fuel to said chamber; a single-unit fuel control apparatus comprising: means for regulating the fuel flow to said nozzles in accordance with a selected schedule of fuel supply during engine operation under varying conditions of airplane altitude and speed, and ambient air temperature; and means, proportionately responsive to a first ratio between the inlet and discharge pressures of said compressor, and to a second ratio between engine speed and the square root of the compressor inlet total air temperature, for regulating said fuel flow so as to obtain a selected minimum flow during engine deceleration, consistent with preventing burner blowout under said varying conditions of engine operation.

9. Fuel control apparatus according to claim 8, including a manual control lever, and means responsive to said lever, for coordinating the functioning of both said regulating means.

10. For an aircraft turbo-jet engine having a main combustion chamber with fuel burner nozzles therein, and an air compressor and a fuel pump for respectively supplying air and fuel to said chamber; a single-unit fuel control apparatus comprising: means for regulating the fuel flow to said nozzles in accordance with a selected schedule of fuel supply during engine operation under varying conditions of airplane altitude and speed, and ambient air temperature; means, proportionately responsive to a first ratio between the inlet and discharge pressures of said compressor, and to a second ratio between engine speed and the square root of the compressor inlet total air temperature, for regulating said fuel flow so as to obtain a selected minimum flow during engine deceleration, consistent with preventing burner blowout under said varying conditions of engine operation; and means, responsive to said first and second ratios for regulating said fuel flow so as to obtain a selected maximum flow during engine acceleration, consistent with preventing compressor stall, under said varying conditions.

11. Fuel control apparatus according to claim 10, including a manual control lever, and means responsive to said lever, for coordinating the functioning of all said regulating means.

12. For an aircraft turbo-jet engine having a main combustion chamber with fuel burner nozzles therein, and an air compressor and a fuel pump for respectively supplying air and fuel to said chamber; a single-unit fuel control apparatus comprising: means for regulating the fuel flow to said nozzles in accordance with a selected schedule of fuel supply during engine operation under varying conditions of airplane altitude and speed, and ambient air temperature; means, proportionately responsive to a first ratio between the inlet and discharge pressures of said compressor, and to a second ratio between engine speed and the square root of the compressor inlet total air temperature, for regulating said fuel flow so as to obtain a selected minimum flow during engine deceleration, consistent with preventing burner blowout under said varying conditions of engine operation; a manual control lever, and means, proportionately responsive to airplane altitude and speed, ambient air temperature, and to said manual control lever for maintaining a substantially constant, selected engine speed, corresponding to a selected position of said lever, under said variable engine operating conditions, at any selected speed between idle and a predetermined maximum permissible engine speed.

13. Fuel apparatus according to claim 12, including a manual control lever, and means responsive to said lever, for coordinating the functioning of all said means.

14. For an aircraft turbo-jet engine having a main combustion chamber, an air compressor and a fuel pump for respectively supplying air and fuel thereto, a tail-pipe with means for supplying and burning additional fuel therein, and an exhaust gas nozzle with means for varying its area; a control apparatus comprising a unitary, hermetically-sealed casing containing therein: first means, responsive to airplane altitude and speed and ambient air temperature, for automatically regulating the fuel supply to said chamber in accordance with a selected schedule of fuel flow, corresponding to varying conditions of airplane altitude and speed, and ambient air temperature; and second means, responsive to airplane altitude and speed and ambient air temperature, for automatically controlling coordinately said fuel supply regulating means and said nozzle area varying means, so as to obtain a selected propulsive thrust on said aircraft, under said varying operating conditions.

15. A control apparatus according to claim 14, including means for automatically regulating the fuel supply to said chamber so as to obtain a selected maximum flow of said fuel during engine acceleration, consistent with preventing compressor stall, under said varying operating conditions.

16. For an aircraft turbo-jet engine having a main combustion chamber and a fuel pump for supplying fuel thereto, a tailpipe with means for supplying and burning additional fuel therein, and an exhaust gas nozzle with means for varying its area; a fuel control apparatus comprising a unitary, hermetically-sealed casing containing therein: first means, responsive to airplane altitude and speed and ambient air temperature, for automatically regulating the delivery of said pump to said chamber in accordance with a selected schedule of fuel flow to said chamber, corresponding to varying conditions of airplane altitude and speed, and ambient air temperature; and second means, responsive to airplane altitude and speed and ambient air temperature, for automatically regulating the fuel supply to said tailpipe so as to obtain a selected, augmenting propulsive thrust on said aircraft from the combustion of said fuel therein, under said varying conditions.

17. Fuel control apparatus according to claim 16, wherein said pump is of the constant displacement type.

18. Fuel control apparatus according to claim 16, wherein the means for supplying fuel to said tailpipe comprises a constant displacement fuel pump.

19. Fuel control apparatus according to claim 16, wherein said means for automatically regulating the delivery of said pump is also proportionately responsive to the ratio of engine speed (R. P. M.) and the square root of the temperature of the air entering said engine.

20. Fuel control apparatus according to claim 16, including means for automatically regulating the rate of fuel flow to said main combustion chamber in accordance with rate of mass air flow therethrough.

21. Fuel control apparatus according to claim 16, including a single manual control lever, and means responsive thereto, for automatically controlling coordinately both of said regulating means.

22. For an aircraft turbo-jet engine having a main combustion chamber and a fuel pump for supplying fuel thereto, a tail pipe and means for supplying and burning additional fuel therein, and an exhaust gas nozzle with means for varying its area; a fuel control apparatus comprising a unitary, hermetically-sealed casing containing therein: means for automatically regulating the delivery of said pump to said chamber in accordance with a selected schedule of fuel flow to said chamber corresponding to varying conditions of airplane altitude and speed, and ambient air temperature; means for automatically regulating the speed of the engine, means for automatically regulating said nozzle area varying means, and means for automatically controlling coordinately all of said regulating means comprising a single manual control lever to which said coordinate control means is responsive.

23. For an aircraft turbo-jet engine having an air compressor and a fuel pump for supplying air and fuel thereto, a fuel control apparatus comprising a unitary, hermetically-sealed casing containing therein: first means, responsive to airplane altitude and speed and ambient air temperature, for regulating the delivery of said pump so as to obtain a selected maximum fuel flow to the engine during its acceleration, corresponding to varying conditions of airplane altitude, airplane speed, and ambient air temperature, and second means, responsive to airplane altitude and speed and ambient air temperature, for preventing compressor stall and engine temperature from exceeding a selected maximum value, during such engine acceleration.

24. Fuel control apparatus according to claim 23, wherein said means are also proportionately responsive to the ratio of engine speed (R. P. M.) and the square root of the temperature of the air at the inlet of the compressor.

25. Fuel control apparatus according to claim 23, including a manual control lever and means for maintaining a substantially constant, selected engine speed, corresponding to a selected position of said lever, under said variable operating conditions, at any selected speed between idle and a predetermined maximum permissible engine speed.

26. Fuel control apparatus according to claim 23, including means for regulating the rate of fuel flow to the engine in accordance with the rate of mass air flow therethrough, so as to produce a selected optimum combustion of said fuel and engine power output, under said varying operating conditions.

27. For an aircraft turbo-jet engine having an air compressor and a fuel pump for supplying air and fuel thereto, a fuel control apparatus, comprising: first means for regulating the delivery of said pump so as to obtain a selected maximum fuel flow to the engine during its acceleration, corresponding to varying conditions of airplane altitude, airplane speed, and ambient air temperature, second means for preventing compressor stall and engine temperature from exceeding a selected maximum value, during such engine acceleration, and means for submerging and actuating the working parts of said first and second means in a bath of said fuel.

28. For an aircraft turbo-jet engine having an air compressor and a fuel pump for supplying air and fuel thereto, a fuel control apparatus, comprising: first means for regulating the delivery of said pump so as to obtain a selected maximum fuel flow to the engine during its acceleration, under varying conditions of airplane altitude, airplane speed, and ambient air temperature, second means for preventing compressor stall and engine temperature from exceeding a selected maximum value, during such engine acceleration, and means for submerging and actuating the working parts of said first and second means in a bath of lubricating liquid separate from said fuel.

29. For an aircraft turbo-jet engine having an air compressor and a fuel pump for supplying air and fuel thereto, a fuel control apparatus, comprising a unitary, hermetically-sealed casing containing therein: first means, responsive to airplane altitude and speed and ambient air temperature, for regulating the delivery of said pump so as to obtain a selected maximum fuel flow to the engine during its acceleration, corresponding to varying conditions of airplane altitude, airplane speed, and ambient air temperature, and second means, responsive to airplane altitude and speed and ambient air temperature, for preventing compressor stall and engine temperature from exceeding a selected maximum value, during such engine acceleration, including means for by-passing fuel around said pump, and means for controlling the fuel flow to the engine by regulating the flow of by-passed fuel.

30. For an aircraft turbo-jet engine having a combustion chamber with fuel burner nozzles therein, a fuel pump for delivering fuel to said nozzles, an air compressor, and a variable area exhaust gas nozzle, a control apparatus comprising a unitary, hermetically-sealed casing containing therein: means for regulating the fuel flow to said burners, means for regulating the area of said exhaust gas nozzle, and means for automatically coordinating the actions of both said regulating means so as to obtain a selected maximum change in engine speed, during engine acceleration and deceleration, consistent with avoidance of compressor stall or lean burner blowout.

31. A control apparatus according to claim 30, including means for regulating the area of said exhaust gas nozzle so as to obtain a selected maximum engine efficiency at every steady state engine speed (R. P. M.)

between idle and a predetermined maximum permissible engine speed.

32. For an aircraft turbo-jet engine having a combustion chamber with fuel burner nozzles therein, a fuel pump for delivering fuel to said nozzles, and a variable area exhaust gas nozzle; a control apparatus comprising a unitary, hermetically-sealed casing containing therein: means for regulating the fuel flow of said nozzles during deceleration of the engine so as to prevent lean burner blowout, and means for automatically coordinately varying the area of said exhaust gas nozzle, during acceleration and deceleration of the engine, so as to obtain a selected maximum rate of change in engine speed.

33. For an aircraft turbo-jet engine having an air compressor and a fuel pump for supplying air and fuel thereto, a tailpipe, and means for supplying and burning additional fuel therein; a control apparatus comprising: first means, responsive to airplane altitude and speed and ambient air temperature, for regulating the delivery of said pump so as to obtain a selected maximum fuel flow to the engine during its acceleration, corresponding to varying conditions of airplane altitude, airplane speed and ambient air temperature; second means, responsive to airplane altitude and speed and ambient air temperature, for regulating the fuel delivery of said pump to said engine so as to prevent compressor stall and engine temperature in excess of a selected maximum value, during such engine acceleration; and third means for regulating the fuel supply to said tailpipe so as to obtain a selected augmenting propulsive thrust from the combustion of said fuel therein.

34. Fuel apparatus according to claim 33, including a single manual control lever, and means responsive to said lever, for coordinately controlling the functioning of all said regulating means.

35. Fuel control apparatus according to claim 33, comprising a single unitary casing which contains all elements of said first, second and third means, except the manual control lever, and which serves as a reservoir wherein all of the said elements are actuated by and submerged in a bath of liquid.

36. A fuel control apparatus for an aircraft turbo-jet engine having an air compressor, and a pump for delivering fuel to said engine; comprising: first and second means for automatically and separately computing respectively the quantities "corrected engine speed" $(N/\sqrt{T_1})$, where $(N)$ is engine speed (R. P. M.) and $(T_1)$ is the (absolute) air temperature at the inlet of said compressor, and "compressor rise ratio" $(P_2/P_1)$, where $(P_2)$ and $(P_1)$ are the respective air pressures at the inlet and outlet of said compressor; and third means, operatively associated with said first and second means, for regulating the rate of fuel flow from said pump to said engine in accordance with said computed quantities.

37. A control apparatus according to claim 36, wherein said first means comprises two separate, but operatively associated, means for respectively measuring engine speed and the total temperature of the air entering said compressor.

38. In a fuel and speed control apparatus for an internal combustion engine having a pump for supplying fuel thereto; means for controlling the rate of fuel flow from said pump to said engine comprising: first means for generating a force proportional to "corrected engine speed" $(N/\sqrt{T_1})$, where $(N)$ is engine speed (R. P. M.) and $(T_1)$ is the absolute air temperature at the inlet of said compressor; and second means, responsive to said force, for varying said fuel flow, during acceleration of the engine, in accordance with said force.

39. In a fuel and speed control apparatus for an internal combustion engine having a pump for supplying fuel thereto; means for controlling the rate of fuel flow from said pump to said engine comprising: first means for generating a force proportional to "corrected engine speed" $(N/\sqrt{T_1})$, where $(N)$ is engine speed (R. P. M.) and $(T_1)$ is the absolute air temperature at the inlet of said compressor, and "compressor rise ratio" $(P_2/P_1)$, where $(P_2)$ and $(P_1)$ are the respective air pressures at the inlet and outlet of said compressor; and second means, responsive to said force, for limiting the maximum rate of said fuel flow to a selected value, which produces maximum engine acceleration consistent with preventing compressor stall.

References Cited in the file of this patent

UNITED STATES PATENTS

| 2,516,909 | Redding et al. | Aug. 1, 1950 |
| 2,566,373 | Redding | Sept. 4, 1951 |
| 2,573,724 | Neal | Nov. 6, 1951 |
| 2,576,352 | Neal | Nov. 27, 1951 |
| 2,580,962 | Sedille | Jan. 1, 1952 |
| 2,581,275 | Mock | Jan. 1, 1952 |
| 2,581,276 | Mock | Jan. 1, 1952 |

FOREIGN PATENTS

| 941,556 | France | July 19, 1948 |
| 626,297 | Great Britain | July 13, 1949 |